US009842454B2

(12) United States Patent
Gerhard et al.

(10) Patent No.: US 9,842,454 B2
(45) Date of Patent: Dec. 12, 2017

(54) ANALYTICS BASED CLIMATE CONTROL IN VENDING MACHINES

(71) Applicant: International Business Machines Corporation, Armonk, NY (US)

(72) Inventors: Elizabeth L. Gerhard, Rochester, MN (US); Robert E. Kilker, Rochester, MN (US); Wayne L. Vlasak, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/087,650

(22) Filed: Mar. 31, 2016

(65) Prior Publication Data

US 2017/0287258 A1   Oct. 5, 2017

(51) Int. Cl.
G07F 11/00 (2006.01)
G07F 9/10 (2006.01)
G06Q 30/06 (2012.01)
G06Q 10/08 (2012.01)

(52) U.S. Cl.
CPC ........... G07F 9/105 (2013.01); G06Q 10/087 (2013.01); G06Q 30/0639 (2013.01); G07F 11/002 (2013.01)

(58) Field of Classification Search
CPC ..... G07F 9/105; G07F 11/002; G07F 17/0071
USPC ...................... 700/236, 240, 242; 221/150 R
See application file for complete search history.

(56) References Cited

U.S. PATENT DOCUMENTS

| 4,183,226 | A |   | 1/1980 | Moore |
| 4,977,754 | A |   | 12/1990 | Upton et al. |
| 5,392,953 | A | * | 2/1995 | Maldanis ................ G07F 11/34  211/59.2 |
| 6,102,162 | A | * | 8/2000 | Teicher ................... G07F 9/105  186/39 |
| 6,131,399 | A | * | 10/2000 | Hall ..................... G06Q 10/087  221/150 R |
| 6,389,822 | B1 | * | 5/2002 | Schanin .................. F25D 29/00  221/150 R |

(Continued)

OTHER PUBLICATIONS

Gleick et al., "Energy implications of bottled water," Environmental Research Letters, vol. 4, No. 1, Feb. 19, 2009, pp. 1-7, IOP Publishing. DOI: 10.1088/1748-9326/4/014009.

(Continued)

Primary Examiner — Timothy Waggoner
(74) Attorney, Agent, or Firm — Jared Chaney

(57) ABSTRACT

A climate-controlled vending machine is monitored using data analytics. The climate-controlled vending machine includes a primary storage unit for storing two or more items. A first slot of an item is determined to be available within a secondary storage unit of the climate-controlled vending machine. The secondary storage unit is a climate-controlled unit. A first item, of the two or more items within the primary storage unit, is transferred to the first slot of the secondary storage unit. The first item within the first slot of the secondary storage unit is altered to a first condition. A selection from a first user is received. In response to the reception of the selection of the first item, the first item is dispensed to the user from a dispensary unit, wherein the item is being of the first condition. The first slot is replenished with a replacement item from the primary storage.

20 Claims, 8 Drawing Sheets

(56) References Cited

U.S. PATENT DOCUMENTS

| | | | |
|---|---|---|---|
| 6,628,764 B1 * | 9/2003 | Petite | G06Q 20/02 |
| | | | 379/106.01 |
| 6,898,942 B2 | 5/2005 | Schanin | |
| 7,150,155 B2 | 12/2006 | Faber | |
| 7,451,892 B2 * | 11/2008 | Walker | G06Q 20/20 |
| | | | 221/236 |
| 7,822,503 B2 | 10/2010 | Merwarth et al. | |
| 8,820,574 B2 * | 9/2014 | Howell | G07F 9/026 |
| | | | 221/1 |
| 9,218,703 B2 * | 12/2015 | Insolia | G07F 9/02 |
| 2006/0259192 A1 * | 11/2006 | Lowe | G06Q 10/06311 |
| | | | 700/236 |
| 2007/0125104 A1 * | 6/2007 | Ehlers | F25D 27/005 |
| | | | 62/157 |
| 2009/0179042 A1 * | 7/2009 | Milan | G07F 11/08 |
| | | | 221/150 R |
| 2015/0026285 A1 | 1/2015 | Stabenow et al. | |

OTHER PUBLICATIONS

Mell et al., "The NIST Definition of Cloud Computing: Recommendations of the National Institute of Standards and Technology," Special Publication 800-145, National Institute of Standards and Technology, Sep. 2011, 7 pages, Gaithersburg, MD.

Nadel, S., "Packaged Commercial Refrigeration Equipment: A Briefing Report for Program Planners and Implementers," Report No. A022, Dec. 2002, 30 pages, American Council for an Energy-Efficient Economy, Washington D.C.

Westphalen et al., "Energy Savings Potential for Commercial Refrigeration Equiptment," Final Report, Reference 46230-00, Jun. 1996, 151 pages, Arthur D. Little, Inc., Cambridge, MA.

* cited by examiner

ANALYTICS BASED CLIMATE CONTROL IN VENDING MACHINES

BACKGROUND

Aspects of the present disclosure relate to data analytics, and more particular aspects relate to improvising efficiency in climate-controlled vending machines using data analytics.

A vending machine is a machine that stores and dispenses items to users based on an exchange of currency for goods. Vending machines may store snacks, items, lottery tickets, etc. and the vending machine may include a unit to control the climate of the items stored within. A climate-controlled vending machine may store items before being dispensed to a consumer.

SUMMARY

According to embodiments of the present disclosure, a method, a system, and a computer program product are proposed to manage a climate-controlled vending machine using data analytics. The climate-controlled vending machine may be monitored using data analytics, may receive selections of items, and dispense the selected item if the item is in stock and is of a first condition.

Embodiments provide a method for monitoring a climate-controlled vending machine using data analytics. A climate-controlled vending machine is monitored using data analytics. The climate-controlled vending machine includes a primary storage unit for storing two or more items. A first slot of an item is determined to be available within a secondary storage unit of the climate-controlled vending machine. The secondary storage unit is a climate-controlled unit. A first item, of the two or more items within the primary storage unit, is transferred to the first slot of the secondary storage unit, the first item being in a condition at the time of transfer. The first item within the first slot of the secondary storage unit is altered to a first condition. A selection from a first user is received, on the climate-controlled vending machine. In response to the reception of the selection of the first item, the first item is dispensed to the user from a dispensary unit, wherein the item is being of the first condition. The first slot is replenished with a replacement item from the primary storage. A system including a memory, a processor device, a data analytics unit, and a climate-controlled vending machine, as well as a computer program product are also disclosed herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
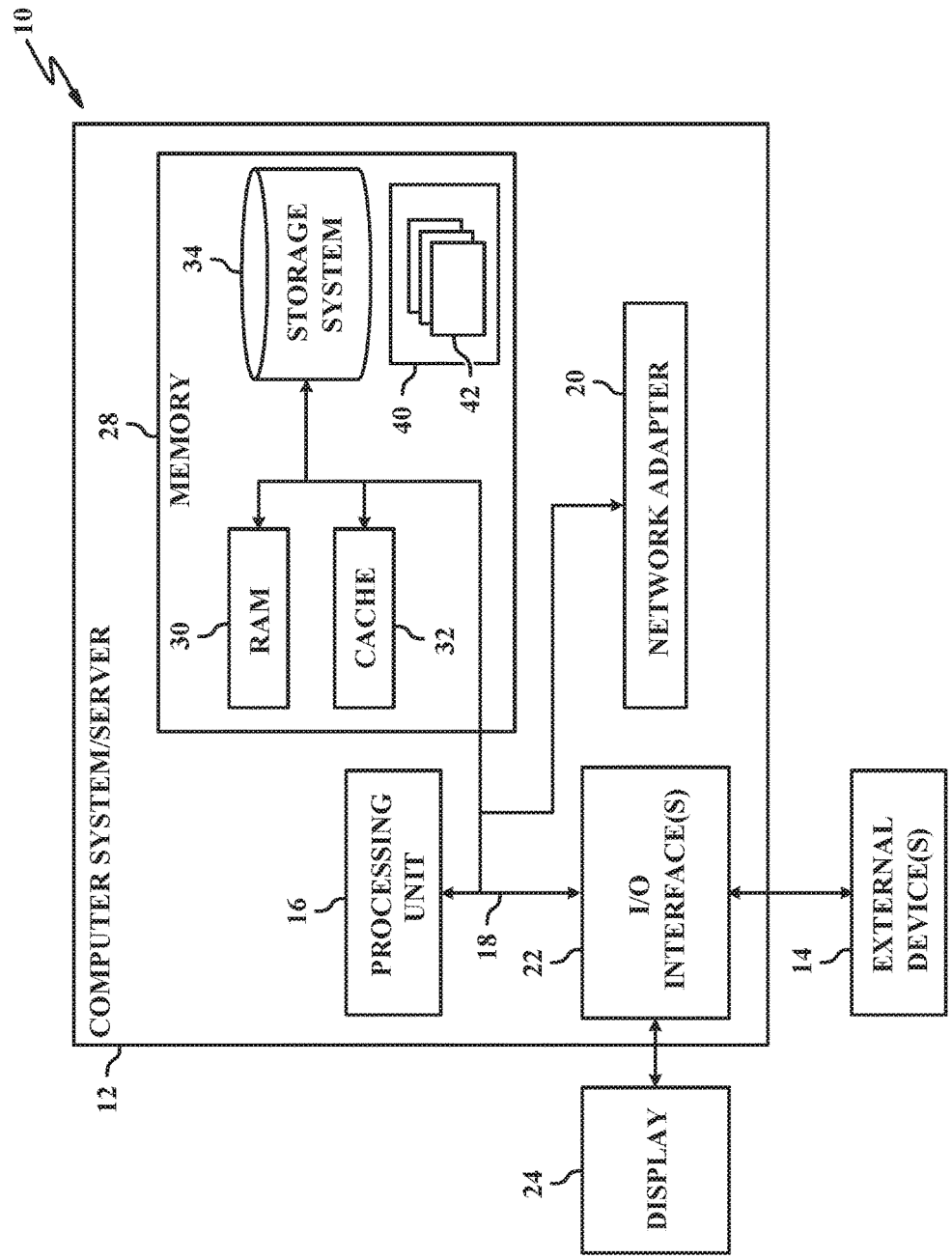
FIG. 1 depicts a cloud computing node, according to various embodiments of the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure may be appreciated through a discussion of various examples using this context. Data analytics may be used to determine use patterns of a vending machine. The vending machine may be equipped with a computer system, which may relay usage information about the machine to a central storage location, or the usage information may be stored locally within the machine. While the present disclosure is not necessarily limited to such applications, various aspects of the disclosure may be appreciated through a discussion of various examples using this context.

The embodiments of the present disclosure may be performed within many different types of vending machines (e.g., snack vending machines, meal vending machines, environment controlled vending machines, or vending machines that dispense items other than consumables) but may be described further herein using climate-controlled vending machines in examples. A climate-controlled (e.g., refrigerated) vending machine may be an environment-controlled vending machine where the environment includes cooling (e.g., refrigeration) the items within the climate-controlled vending machine. Examples of other environment-controlled vending machines may include heated vending machines, humidity controlled vending machines, etc.

The vending machine may be configured to become a "smart" vending machine. A smart vending machine may include a computer system for determining usage patterns with data analytics. Usage patterns may include which items are regularly purchased, peak vending usage hours, peak vending usage days, and various forms of supply and demand with respect to the vending machines. The data analytics may determine peak (or, trough) purchasing times of items in general and/or the peak purchasing times of specific items. The usage patterns may be gathered as data analytics to determine how to properly manage, handle, and store items in a climate-controlled vending machine.

Embodiments of this disclosure describe various ways that the energy efficiency of climate-controlled vending machines may be improved by combining a smaller climate-control unit and data analytics within a climate-controlled vending machine. For example, in some refrigerated vending machines, a single large refrigeration unit is used to cool each of the items (e.g., beverage) within a single storage unit of the vending machine. Currently, a refrigerated vending machine may use, for example, between 7-14 KWh in a typical day. At a rate of approximately $0.09-$0.13 per KWh for electricity, the average annual operation cost may be roughly $300-$350. However, in some low usage hours, only two or three items may be distributed within a reasonable period of time, with some vending machines only selling a few items a day, while others distribute more.

Embodiments described in this disclosure propose using a smaller climate-controlled unit (e.g., refrigerated unit) within a secondary storage unit to cool (or heat, etc.) a selected number of items (e.g., beverages) within the climate-controlled vending machine. Some embodiments include the use of data analytics to help determine which items are most frequently purchased. It should be noted that, in embodiments, the term smaller climate-control unit refers to a smaller secondary storage unit with a climate-control capacity or secondary section where a climate of the secondary section may be controlled within the vending machine itself. The smaller secondary storage unit may be smaller in comparison to a larger primary storage unit. For example, the smaller climate-controlled secondary storage unit may store twenty items while the primary storage unit may store 200 items. By using a smaller climate-controlled unit (e.g., lower British Thermal Unit (BTU) requiring cooling unit), operators of the vending machine may reduce operating costs due to the lower power consumption of the smaller climate-controlled unit. Vending machine owners or operators could also see a reduced initial purchase or build price due to the reduced cost of the smaller climate-controlled unit.

The smaller climate-controlled unit may cool a smaller secondary storage unit that may store and cool a few items of each type with an overflow of each type being stored in a larger, primary storage unit. For example, the secondary storage unit may hold three of each item within the climate-controlled vending machine, while fifty of each of the items may be contained in the larger, primary storage unit. By reducing the size of climate-controlled unit, the power consumption that is required by the climate-controlled vending machine may be reduced.

By gathering the usage information, with data analytics, the smart vending machine may use various interpretations of acquired or received supply and demand information to inform and control how many types of each item are stored within the smaller climate-controlled unit. Additionally, since the shelf life of some items may be affected by fluctuations in a condition (e.g., temperature) of the item, only cooling the items that will be sold within a given time period may help increase the shelf life of the items. Furthermore, the machine could have indicators for each vending selection to show customers which items are currently within a condition (e.g., chilled) so that they could make an alternate selection if the customers' selected choice is not in stock or is currently not at a first condition (e.g., chilled).

In embodiments, an item may be determined as the first condition by a condition sensor (e.g., temperature sensor) or timer. The temperature sensor may monitor one or more items of the secondary storage unit to determine if they are at a desired vending condition (or first condition) for vending (i.e., dispensing) the item. Depending on the smart vending machine, a desired vending condition may be a temperature threshold (or temperature range) for an item at the first condition. For example, a defined desired temperature may range between 38–42° F. and a temperature threshold may be set at 42° F. for the desired vending condition. If the item is within that range, then the item may be determined as chilled. In an example, the temperature sensor may measure the temperature of the items or the container of the items. If the temperature of the item or container of the item has reached the desired temperature (e.g., 42° F., or between 38-42° F.) then the item may be ready to be dispensed.

In various embodiments, a determination that an item has reached the desired temperature may include a determination of a temperature threshold. The determination may be based on the amount of time the item has spent in the secondary storage unit including the smaller climate-controlled unit. The temperature of the secondary storage unit may be recorded and used to determine the amount of time an item would require to be at the first condition (i.e., within the defined temperature range). For example, an item may be distributed from the primary storage unit into a secondary storage unit with a temperature set at 38° F. An item may require a six-minute time threshold at the 38° F. temperature to go from a temperature of 75° F. within the primary storage unit to reach the 38° F. temperature. Upon reaching the six-minute time threshold, the item could be available to be dispensed upon a purchase by a user.

The data analytics may be stored on site within the smart vending machine (e.g., within a computer system) and may include a determination on how many items are sold. By storing the data analytics locally, the computer system of the smart vending machine may control when a new item is to be added. Local data storage may reduce the need to have the machine constantly connect to the Internet or a large database of information. If an end user desires to have more information about the operation and usage of the smart vending machine, the data analytics may easily be expanded to a local or wide area storage network (WAN) (or public cloud) for the smart vending machines. Information such as environmental temperature (i.e., the temperature outside the machine) or the time of day or year when the smart vending machine receives peak demand can be collected. General supply and demand information may generally be collected through techniques known to one skilled in the art.

In various embodiments, a smart vending machine may further include compartmentalization or ordering of items. A compartmentalization may change a configuration of the secondary storage unit, which may reduce costs. Frequently purchased items (e.g., preferred items) may be placed in a closer proximity to the climate-controlled unit to alter and/or achieve the first condition of the preferred item more quickly than another item. Based on the gathered data analytics, the smart vending machine may position items with a higher chance of being purchased in preferred spots closer to the climate-controlled unit of the secondary storage unit. For example, a first item may be a preferred item and the secondary storage unit may include a climate-controlled unit that is positioned on the right side of the secondary storage unit. The first item may be positioned such that the first item is in the slots on the right side of the secondary storage unit such that the second item is cooled faster than an item placed on the left side of the secondary storage unit.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Characteristics are as follows:

On-demand self-service: a cloud consumer may unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities may be rapidly and elastically provisioned, in some cases automatically, to quickly scale out and rapidly released to quickly scale in. To the consumer, the capabilities available for provisioning often appear to be unlimited and may be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage may be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via input/output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
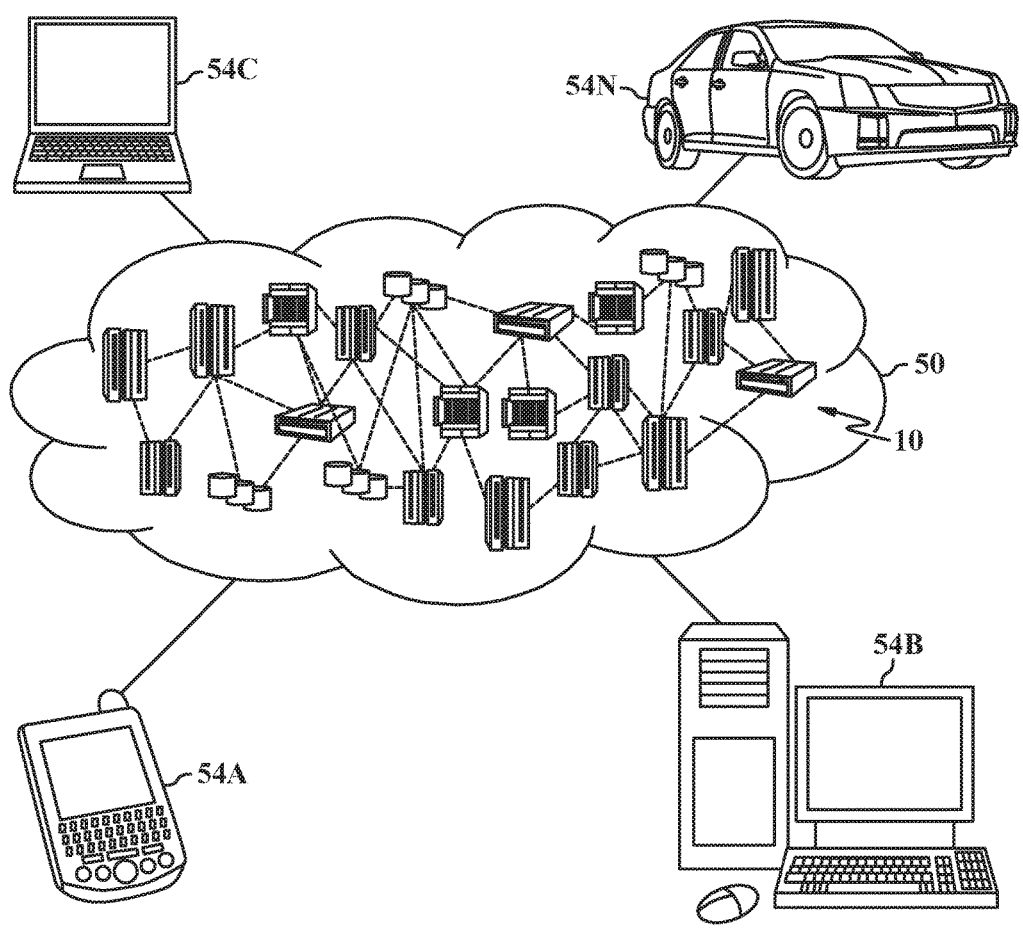
FIG. 2 depicts a cloud computing environment, according to various embodiments of the disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 may communicate with any type of computerized device over any type of network and/or network addressable connection (e.g., using a web browser).

Figure 3:
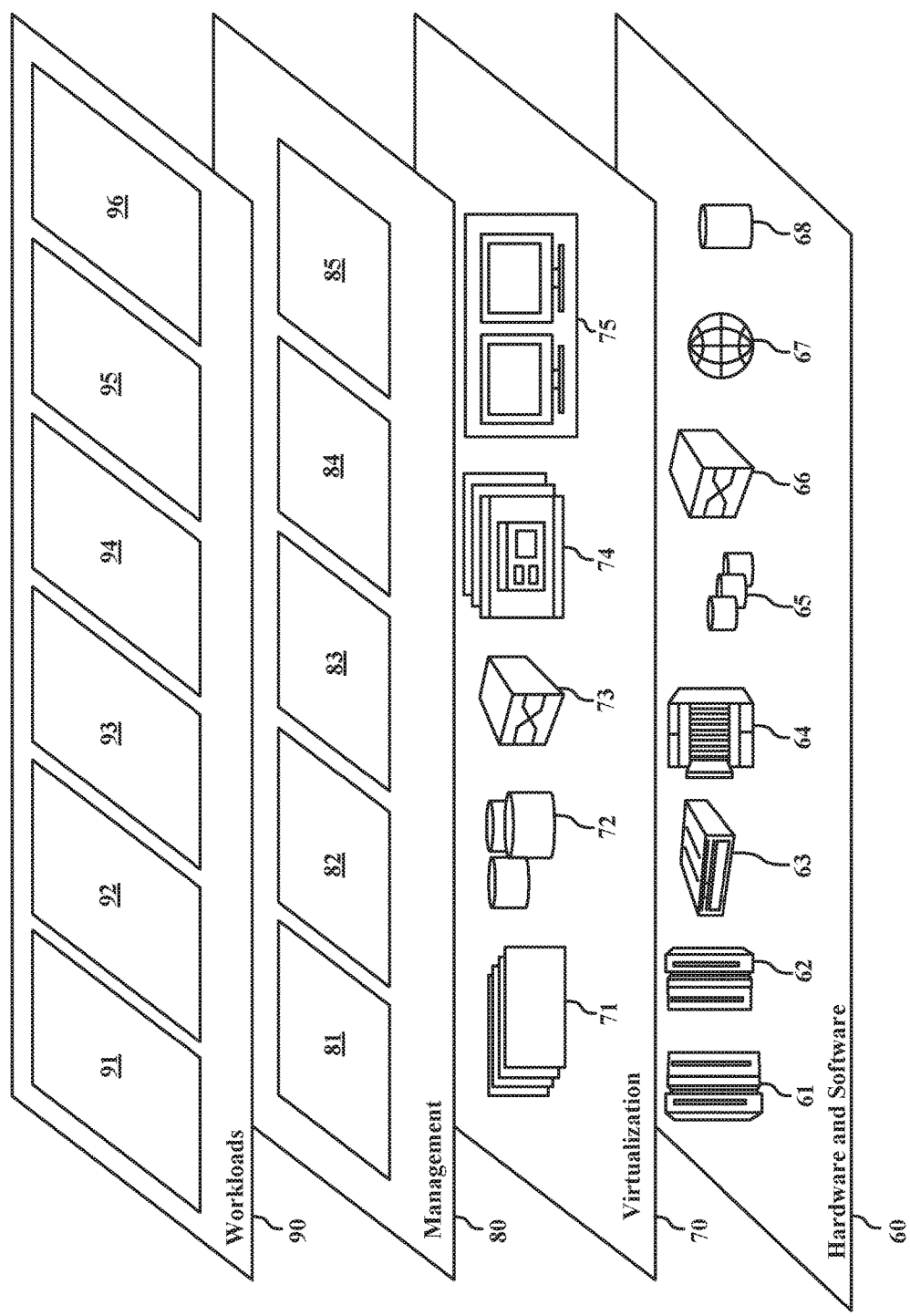
FIG. 3 depicts abstraction model layers, according to various embodiments of the disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96. The data analytics processing 94 layer may be used to determine usage statistics of the smart vending machines, and may be described further herein.

Figure 4:
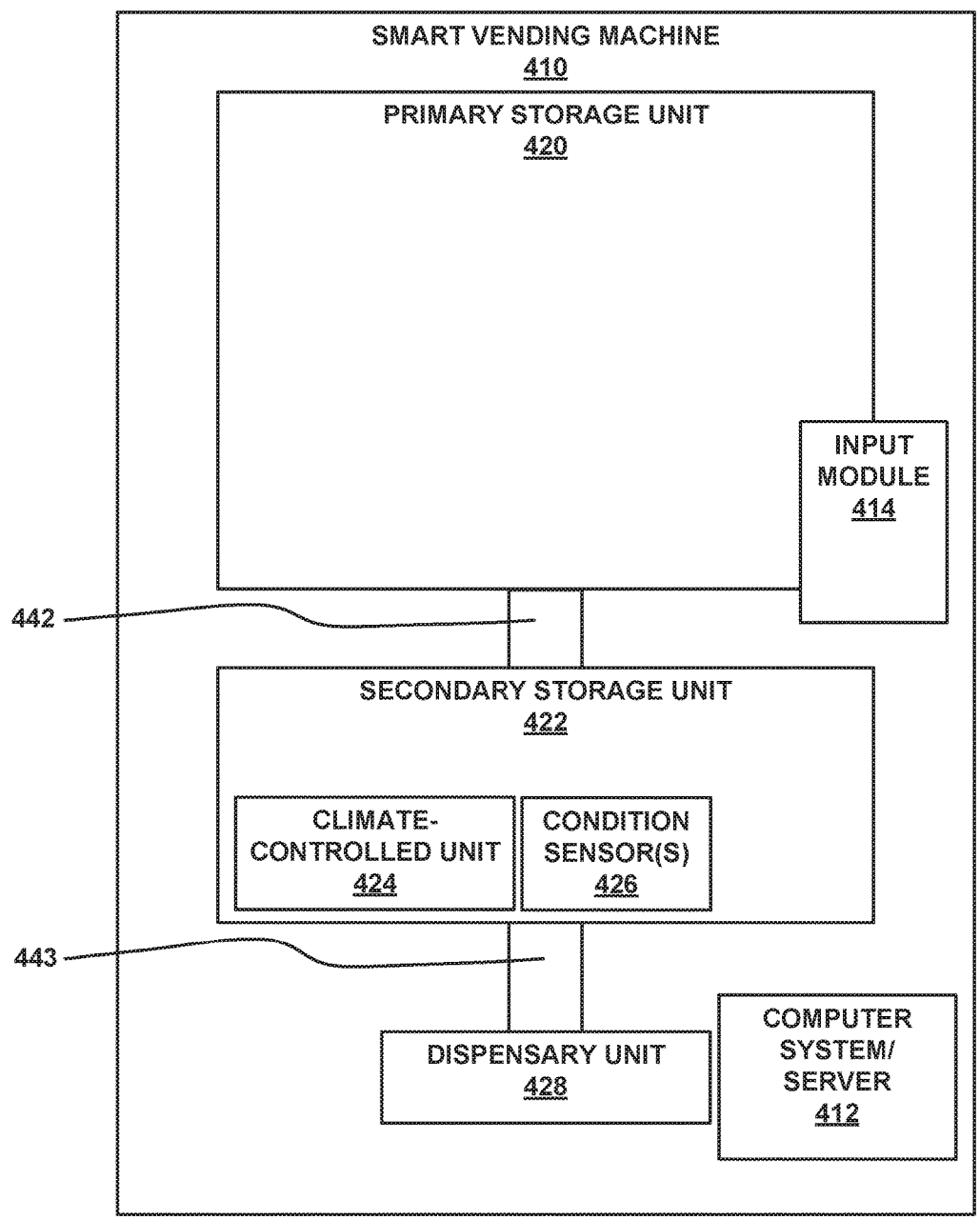
FIG. 4 depicts an example of a vending machine including a primary storage unit and a secondary storage unit, according to various embodiments of the disclosure.

FIG. 4 depicts an example of a vending machine including a primary storage unit and a secondary storage unit, according to embodiments. The exemplary vending machine depicts one possible embodiment of a vending machine, and may be modified or altered depending on various configuration preferences. The exemplary vending machine 410 includes a computer system/server 412, which may monitor usage data and/or statistics of the smart vending machine 410. The smart vending machine 410 may include a primary storage unit 420, a secondary storage unit 422, a computer system/server 412, an input module 414, one or more distribution pathways 442 and 443, and a dispensary unit 428. The exemplary vending machine may be a smart vending machine configured to record items that are vended upon a selection of a user. The exemplary vending machine may be a climate-controlled smart vending machine configured to control the climate of the secondary storage unit 422 altering the condition for vending the items stored within the secondary storage unit. For example, the climate-controlled smart vending machine may control the temperature of items within a secondary storage unit before vending the items to a user. The temperature of the items within the secondary storage unit may include altering the items with the use of a climate-control unit 424 within the secondary storage unit 422. Further herein, the climate-controlled smart vending machine may be a refrigerated vending machine configured to chill one or more items (e.g., beverages) before vending a selected item to a user based on an input.

The input module 414 may receive selections from a user for the purchase of an item. Upon receiving a selection from a user, the input module 414 may perform a function. The functions of the input module 414 may include receiving a selection of the item, informing the user that the item is not in stock, informing the user that the item has not reached a vending condition (e.g., reaching the temperature threshold, chilled), or informing the user that the item is stored within a second smart vending machine within a proximity (e.g., FIG. 5). The input module 414 may then perform the available function(s).

The user may select a desired item by way of the input module 414 and if the item is in stock within the smart vending machine 410, the selected item may be dispensed to the user through the dispensary unit 428 from the secondary storage unit 422 through the second distribution pathway 443. If the user selects an item, that is both in stock and chilled, then the selected item may be dispensed to the user via the dispensary unit 428. For example, a user may select a lemon soda; the lemon soda may be in stock and chilled within the secondary storage unit 422. The lemon soda may then be dispensed to the user.

In various embodiments, input module 414 may be a graphical user interface (GUI), a display, or a series of buttons and indicators. The input module 414 may receive an input from a user, which may include the user inputting a selection of an item that may be stored within the vending machine on the input module. For example, the input module may be a GUI with a touch screen interface. The user may press a section of the screen indicating a first item. The input module may register the input of the user, and may vend the first item, inform the user that the first item is out of stock, or inform the user that the first item is not yet chilled.

According to one embodiment, the user may select a desired item by way of the input module 414. If the selected item is not in stock, a user may be informed via the input module 414 that the selected item is unavailable. Accordingly, the selected item may not be dispensed to the user. If the selected item is not in stock, the input module 414 may inform the user that the item is not in stock and allow the user to receive a refund (i.e., not charge the user), or allow the user to select a replacement item in place of the desired item. For example, the user may select from a first vending machine a cherry cola and the cherry cola may be out of stock within the first vending machine. The user may then request a refund from the smart vending machine. If the item is not in stock, then the user may be informed of a second smart vending machine (e.g., smart vending machine B 524, FIG. 5) within a proximate distance, e.g. 800 feet.

The user may select a desired item. If the selected item is not yet chilled, a user may be informed via the input module 414 that the selected item is not currently available. If the selected item is not currently available, the input module 414 may communicate with the computer system/server 414 to determine an estimated "wait time." The wait time may be the approximate amount of time required before the selected item is chilled. The user may wait the determined wait time before the desired item is dispensed, make a replacement selection, or the input module 414 may also inform the user of a second smart vending machine within a proximate distance.

In various embodiments, the user may override the not-yet-chilled determination on the input module 414 and request that the smart vending machine 410 vends the desired item before the desired item is chilled. For example, the user may desire a cola from a first smart vending machine, such as the smart vending machine. The first vending machine may currently be storing two colas within its respective secondary storage unit (e.g., secondary storage unit 422) with temperatures of 45° F. and 46° F., and the first vending machine may have a temperature threshold for vending of 42° F. (or desired temperature range of 38–42° F.). The smart vending machine may inform the user that the temperature may be overridden by request of the user, and the user may request the override to vend the desired cola to the dispensary unit (e.g., dispensary unit 428) in response to the input of the user.

The primary storage unit 420 may store an "overflow" of items. One or more types of items may be stored within the smart vending machine 410. The one or more types of items may be organized and stored within the primary storage unit 420. Upon a purchase, through the input module 414, a replacement item may take the position of the purchased item in the secondary storage unit 422. The replacement item may be the same item that was purchased or an item that was determined to be a more frequently purchased item. Data analytics pertaining to the determination of the replacement of purchased items is described further herein (e.g., FIG. 7). In various embodiments, the primary storage unit 420 or the first distribution pathway 442 may include a condition sensor (e.g., like the condition sensor(s) 426 of the secondary storage unit 422) for determining the condition of the item before being distributed to the secondary storage unit 422. The primary storage 420 may distribute items to the secondary storage unit via the distribution pathway 442.

The secondary storage unit 422 may store the one or more items to be sold. The items may be determined as a set of items stored within the secondary storage unit 422. The one or more items within the secondary storage unit 422 may be cooled by a climate-control unit 424. The climate-control unit 424 may decrease the temperature of the secondary storage unit 422 such that items within the secondary storage are cooled to or below the temperature threshold. Cooling of the primary storage unit 420 and secondary storage unit 422, if any, may be independent of each other. When the temperature of the item reaches or falls below the temperature threshold, the items may be determined to be chilled.

A condition of the items may be measured by one or more condition sensors 426 (e.g., temperature sensor or humidity sensor (hygrometer)). For example, the condition sensor(s) 426 may measure or receive the temperature of each of the items within the secondary storage unit 422, or a collective temperature, according to another embodiment. The condition sensors may determine a first condition (e.g., chilled) of the item for vending if the first item is in a condition for vending (e.g., below a temperature threshold of 42° F.). In various embodiments, the condition sensor 426 may be a singular unit able to read the temperature of each of the items within the secondary storage unit. The singular condition sensor 426 may record the temperature of the items using infrared light (e.g., infrared thermometer). In other embodiments, there may be multiple condition sensors 426, which may monitor the one or more items within the secondary storage unit or the condition sensors may be contained within the items and monitored by a condition sensor unit.

The computer system/server 412 may record and manage the data acquired during the operation of the smart vending machine 410. Data acquired may include item selection statistics, usage statistics, primary storage unit 420 and secondary storage unit 422 stock, and/or other various information. The computer system/server 412 may communicate though wired or wireless connections to the other units within the smart vending machine 410. For example, the computer system/server may connect to the input module 414 to record selections from a user. In an additional example, the computer system/server may connect to the condition sensor(s) 426 of the secondary storage unit to record the temperatures of each of the one or more items within the secondary storage unit. The computer system/server 412 will be described further herein.

In various embodiments, to increase an operating efficiency of a climate-controlled smart vending machine configured to cool items, the secondary storage unit may be physically positioned below the primary storage unit of the smart vending machine. By placing the secondary unit below the primary unit, items within the primary unit may be cooled by their proximity to the secondary storage unit. This may also reduce the amount of cool air being lost when new containers are added to the secondary storage unit.

Figure 5:
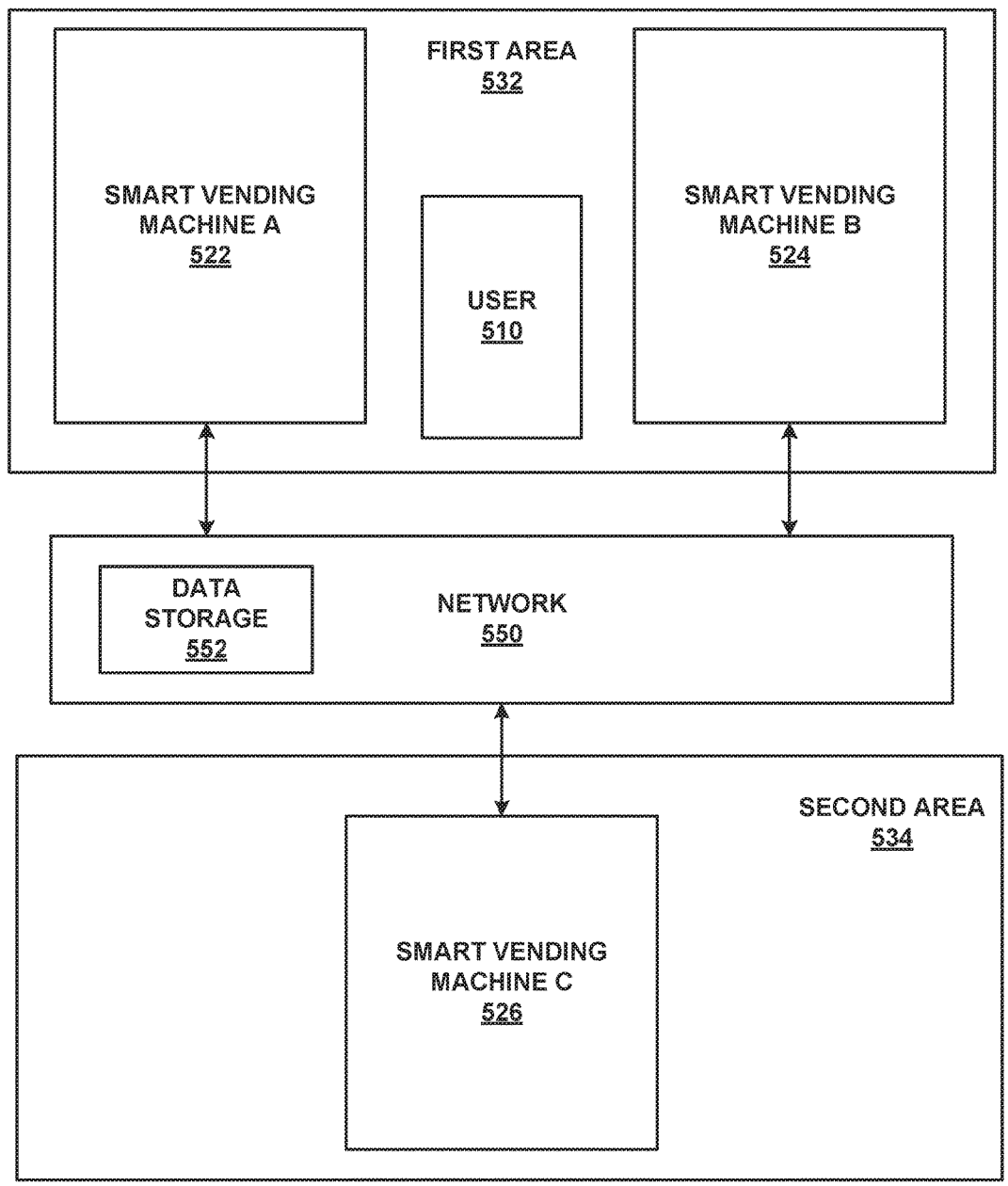
FIG. 5 depicts a wide area network including one or more smart vending machines, according to various embodiments of the disclosure.

FIG. 5 depicts a network of one or more connected vending machines, according to embodiments. The network 550 may connect one or more smart vending machines together and the network may store data analytics gathered from the one or more smart vending machines within a data storage 552. The one or more vending machines may include a first smart vending machine (SMART VENDING MACHINE A 522), a second smart vending machine (SMART VENDING MACHINE B 524), and a third smart vending machine (SMART VENDING MACHINE C 526). The first smart vending machine 522 and the second smart vending machine 524 may be within a first area 532, and the third smart vending machine 526 may be within a second area 534.

The first smart vending machine 522 and the second smart vending machine 524 are within the same first area 532 and may be considered within a proximate distance of each other (e.g., 500 yards). The third vending machine 526 may be within a second area 534 outside the first area 532 and may be considered not within a proximate distance of the first smart vending machine 522 or the second smart vending machine 524. The smart vending machines may be climate-controlled smart vending machines. The climate-controlled smart vending machines may dispense items to a user upon the selection of an item and a determination that the item is available. The item availability may be determined with a determination if the item is in stock and a determination if the item has reached a condition for vending (e.g., chilled) as a first condition.

A user 510 may be within the first area and make a selection on the first smart vending machine 522 for a desired item. If the desired item is not available, but is stored within another smart vending machine within a proximity, the user may be informed, by an input module (e.g., input module 414, FIG. 4), of the second smart vending machine 524 that is within the same first area 532. The user may be informed that the desired item is currently in stock and chilled at the second smart vending machine 524 through input module of the first smart vending machine 522. For example, a user may input an item selection at a first smart vending machine for a diet cola. The first smart vending machine may be out of stock or may not have a chilled diet cola at the first condition (or ready) for dispensing. However, on the floor above in a second smart vending machine a diet cola may be ready for dispensing. The user may be informed via the input module that both the first smart vending machine does not currently have a chilled diet cola ready for dispense and the second smart vending machine is within the same first area (or proximate distance) of the first smart vending machine that does currently have the chilled diet cola ready for dispense. The user may request a refund (or not be charged) and travel to the second vending machine to purchase the desired diet cola.

The third smart vending machine 526 may not have a vending machine within a proximity resulting in only the third smart vending being within the second area 534. If a user 510 makes a selection of an item that is not in stock or has not currently met a condition for vending, then the third smart vending machine 526 may not be able to offer a suggestion of an additional vending machine containing the item. Additionally, if a user 510 makes a selection of an item on the first smart vending machine 522 in the first area 532 the user may not be able to see the stock of the third vending machine 526 because the third vending machine is not within the first area 532. In various embodiments, the first area and the second area may be merged if the proximate distance is changed for the first, the second, or the third smart vending machine.

Figure 6:
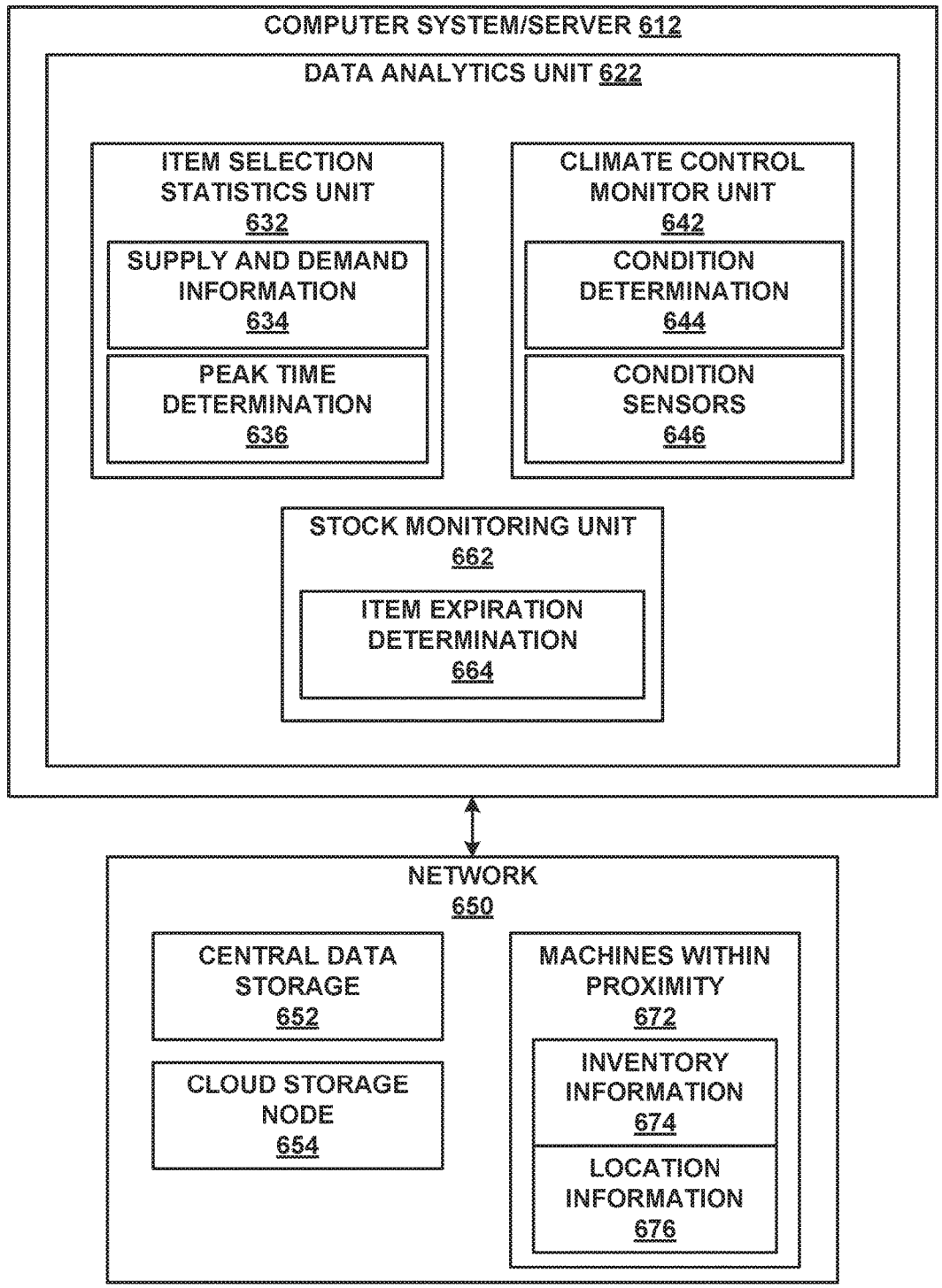
FIG. 6 depicts communication between a data analytic unit of a computer system/server and a cloud computing node, according to various embodiments of the disclosure.

FIG. 6 depicts a communication between a data analytics unit 622 of a computer system/server 612 and a cloud storage node 654, according to embodiments. A computer system/server 612 may include a data analytics unit 622 for determining usage statistics of a smart vending machine (e.g., 410 of FIG. 4). In various embodiments, the computer system/server 612 may also communicate to off-site storage using a network 650. The network 650 may include a central data storage 652, a cloud storage node 654, and/or other vending machines within a proximity 672. An example computer system/server 612 coupled to a network 650 is illustrated but not limited to the units described herein. For example, the computer system/server 612 may be constructed to host additional units or communicate with additional systems over the network 650.

The data analytics unit 622 of the computer system/server 612 may include an item selection statistics unit 632, a climate control monitor unit 642, and a stock monitoring unit 662. The data analytics unit 622 may be used to increase operating efficiency of the smart vending machine and provide information to the operators about stock and expiration of items stored in the smart vending machine.

The item selection statistics unit 632 may include supply and demand information 634 and peak time determination 636 information. The item selection statistics unit 632 may be used to determine how to increase an operating efficiency of the smart vending machine. Based on the supply and demand information 634 and the peak time determination 636 information, the computer system/server 612 may predict when a purchase of an item is likely and when a purchase of an item is not likely. The peak time determination 636 information may be used for determining if usage falls below (or above) a certain threshold, causing the smart vending machine to reduce (or increase) the climate control of the items within the secondary storage unit. For example, a first smart vending machine may typically not receive purchases between the hours of 11:00 PM to 5:00 AM the next day. The smart vending machine may then reduce the cooling of the climate-control unit to reduce energy consumption over relatively low purchase time periods. In various embodiments, the smart vending machine may include proximity sensors (e.g., motion sensors) to observe peak time determinations.

In various embodiments, purchase prediction may be available to the smart vending machine based on the habits of a user or multiple users. The supply and demand information 634 may be gathered by the data analytics unit 622 to develop a usage pattern of a first smart vending machine. The usage pattern may include hourly purchase statistics. For example, the hourly purchase statistics may determine that four item purchases happen every day at 1:00 PM and include one cola, two diet colas, and one lemon soda. The smart vending machine may use the hourly purchase statistics to have those four items within the secondary storage unit and chilled for the purchases at 1:00 PM.

The climate control monitor unit 642 may take readings using the condition sensors 646 of the primary storage unit and the secondary storage unit (i.e., conditions sensor(s) 426, FIG. 4). The readings may include chilled determination 644 readings, and condition sensor 646 readings. The chilled determination 644 readings determine that an item is ready to be dispensed. The condition sensor 646 readings may include measuring the temperature of items within the primary storage unit and items within the secondary storage unit. In an example, a first item may be stored within the secondary storage unit. A condition of the first item may be measured by a condition sensor. The condition sensor may record the temperature of the first item at 47° F., which is outside the chilled determination reading. Upon reaching a temperature of 42° F., the item may reach the chilled determination reading and be available for dispensing. If the item is available for dispensing then an input module of the smart vending machine may alert the user that the first item is available for dispensing.

The stock monitoring unit 662 may include an item expiration determination 664. The stock monitoring unit 662 may record purchases of users, update the stock upon changes to the stock, and maintain data on the remaining stock of items within the smart vending machine. The stock monitoring unit 662 may update the stock upon changes to the supply and demand information. Upon a completed purchase by a user, and associated dispensing, the stock may be updated and may be sent to the central data storage 652. The remaining stock data of the stock monitoring unit 662 may include a count of the items stored within the primary storage unit and the secondary storage unit (FIG. 4). A stock threshold for the remaining stock may be set for each of the one or more types of items. For example, a stock threshold may be set at 10% stock of full, where if the vending machine can hold 100 units of a first item, then the stock monitoring unit may transmit a low stock alert if 10% of the total stock remains. When ten units (the stock threshold) of the first item remain within the smart vending machine, within the primary unit and secondary unit combined, the computer system/server 610 may issue a low stock alert. The low stock alert may be issued through the network 650 to the central storage node 652 or the cloud storage node 654 which may be accessed by an operator (or manager) of the smart vending machine which may remedy the low stock of the smart vending machine.

The item expiration determination 664 may be implemented to alert an operator that one or more items have expired and removal from the smart vending machine may be requested. Upon the determination that one or more items within the smart vending machine are expired, an alert may be issued through the network 650. The item expiration determination 664 information may be sent to the central data storage 652 or the cloud storage node 654, which may alert (or be accessed by an operator for determining) that one or more items may be removed. For example, a smart vending machine may have eight items within the primary storage unit that are past their expiration dates. The smart vending machine may alert an operator through the network to a central data storage 652, where the operator may access the information regarding which eight items should be removed.

In various embodiments, even if one item of the one or more items has not been purchased (e.g., the purchase percentage of the one item is 0%), the item may be stored and chilled within the secondary storage unit available to be purchased. Each item of the one or more items may be required to be available for purchase. For example, if there are eight different types of items and ten available slots, then eight of the ten available slots may be filled with the eight different types of items and two slots may be filled with the two most frequently purchased items.

The network 650 may include a central data storage 652, a cloud storage node 654, and other machines within proximity (e.g., a second smart vending machine within a proximity) 672. The central data storage 652 may be accessed by a computer through the network 650 to one or more smart vending machines within a proximity 672. Data analytics from each of the one or more smart vending machines within the proximity 672 may relay information to the central data storage 652 where an operator may monitor all the smart vending machines 672. The central data storage 652 may compile data analytics across each smart vending machine 672 connected to the network 650. For example, an operator may be able to access the stock of three smart vending machines connected through the network. The operator may discover that the second smart vending machine is low on diet cola and promptly fill the second vending machine.

The cloud storage node 654 may be an offsite or online storage device, which may be accessed by an operator without having to connect directly to the computer system/server 612. The cloud storage node 654 may be accessed through the Internet to determine usage statistics gathered by the data analytics unit 622. For example, an operator may access the data of the data analytics unit 622 stored on a cloud storage node through an Internet connection to determine the stock of the diet cola of a first smart vending machine.

The other machines within proximity 672 may communicate with the computer system/server 612 to determine inventory information 674 and location information 676. If a user makes a selection for an item that is not in stock, then the smart vending machine may communicate with one or more machines within proximity 672 to determine if the item is in stock at a second smart vending machine using inventory information 674 of the one or more machines within proximity. For example, the user may make a selection of a cola at a first smart vending machine, which may be out of stock of the cola. The first smart vending machine may communicate over the network 650 and determine that a second smart vending machine contains the cola. The user may then be informed through the location information 676 where the second smart vending machine is within a proximity 672 to the first smart vending machine.

In various embodiments, usage statistics gathered by the data analytics unit 622 may also contain purchase statistics and may be gathered based on selections by users on the input device. Purchase statistics may include a time of day the selection was made, the item selected, and an average wait time after selection. Purchase statistics may result in information being gathered based on the service provided by the smart vending machine. Depending on the average wait time after selection, users may become upset if wait times are longer than desired.

In various embodiments, the smart vending machine may make a predicted purchase determination. The smart vending machine may determine if a purchase of an item may be made. By determining if a purchase will be made, based on the time of day the item was selected and the type of item selected, the smart vending machine may be ready to dispense the item based on previous purchases. For example, if gathered data analytics show only one purchase of an item occurs during the hours of 11:00 PM to 5:00 AM every night, and it happens regularly around 2:00 AM, the smart vending machine may cool the secondary storage unit within the predicted time, and then after the purchase, the cooling capacity may be reduced. Purchase prediction through the predicated purchase determination of items within the smart vending machine may utilize the peak time determination to determine when a purchase will be made.

Figure 7:
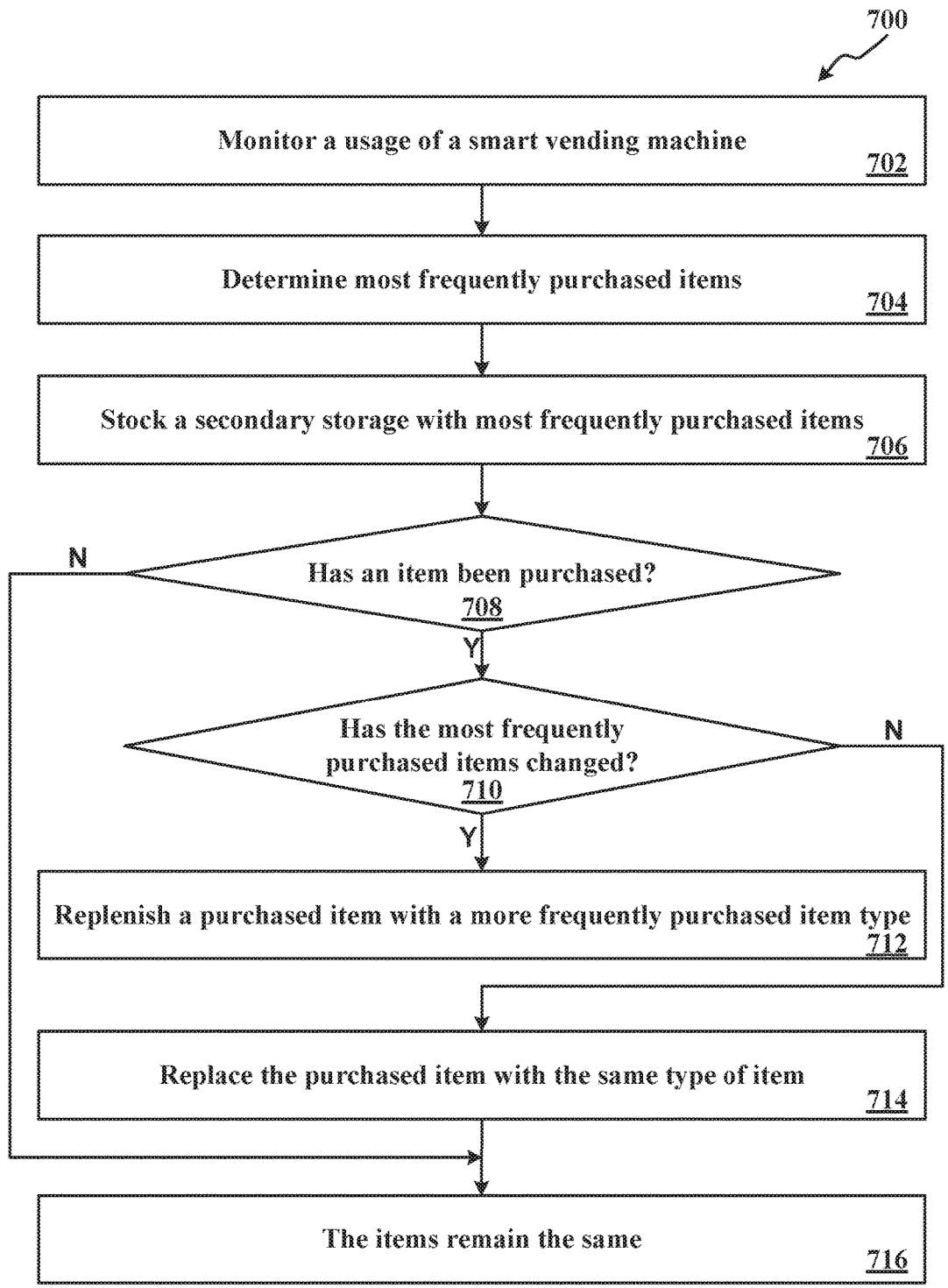
FIG. 7 depicts a flowchart for determining the replacement of a purchased item, according to various embodiments of the disclosure.

FIG. 7 depicts a flowchart for determining the replacement of a purchased item, according to embodiments. When an item is purchased from a smart vending machine, a replacement item may be sent to the secondary storage unit, and the replacement item may take the space originally occupied by the purchased item. In the following method 700, a replacement item (e.g., beverage) will be determined based on the most frequently purchased items.

In operation 702, a usage of a smart vending machine is monitored. The smart vending machine may include a primary storage unit for containing an "overflow" of one or more types of items, an input, a dispensary, and a data analytics unit. In various embodiments, an exemplary smart vending machine may include a secondary storage unit with a climate-control unit for changing the conditions of the one or more items.

In operation 704, the most frequently purchased items are determined. The frequently purchased items may change over a period of time based on the purchases of items. For example, a smart vending machine (such as 410 from FIG. 4) may be operating for a period (or interval) of time and may already have a list for the most frequently purchased items. The list may be supported by data analytics. In an additional example, a smart vending machine may be initializing for the first time. Upon startup, the smart vending machine may be programmed to receive a list of the most frequently purchased items through a network from a central data storage or cloud storage node (e.g., central data storage 652 and cloud storage node 654, FIG. 6). The initialization of the smart vending machine may include developing the list based on user purchases.

In operation 706, the secondary storage unit (e.g., secondary storage unit 422, FIG. 4) is stocked with the most frequently purchased items. Based on a frequently purchased items list (whether developed or received), the smart vending machine may fill the secondary storage unit with the most frequently purchased items. The frequently purchased items stocked within the secondary storage unit may be based on the number of available item slots the secondary unit may hold. Depending on the number of types of items and the available item slots, a set of items may be determined and the secondary storage may be filled with the determined set of items. Items with a higher determined chance of being purchased will fill more slots and items with a lower determined chance of being purchased will fill less slots. For example, a secondary unit may have available slots for twenty items, and there may be eight different types of items (e.g., beverages), such as: cola, diet cola, cherry cola, lemon soda, tropical soda, root beer, diet root beer, and water. Based on the determined chance for each of the one or more of types of items, the slots of the secondary storage unit may be filled. The determined chance of the one or more items being selected may be determined based on a purchase percentage out of a total 100%. The percentages may be cola 25%, diet cola 30%, cherry cola 5%, lemon soda 10%, tropical soda 5%, root beer 10%, diet root beer 5%, and water 10%. Using the percentages, a set of the items may be determined for the number of available slots within the secondary storage unit. The set of items may be distributed such that there are five colas, six diet colas, one cherry cola, two lemon sodas, one tropical soda, two root beers, one diet root beer, and two waters totaling the twenty items that the secondary storage unit can hold.

In decision block 708, a determination is made if an item has been purchased based upon an input from a user. A user may interact with the input module (such as input module 414, FIG. 4) but not complete the purchase of an item. For example, a user may not complete a purchase if the user has insufficient funds. If in decision block 708 an item is selected and purchased, then the method 700 may progress to decision block 710. If in decision block 708 a user interacts with the input but an item is not purchased, then the method 700 may progress to operation 716 where the resultant stock within the secondary storage unit remains the same.

In decision block 710, a determination is made if the most frequently purchased items have changed. If a purchase has been made, the most frequently purchased items may have changed. For example, if a less frequently purchased item is purchased, then the item may take the place of another item when the space is available. In the example, a first item may have a purchase percentage of 40% and a second item may have a purchase percentage of 39%. If a user purchases the second item changing the purchase percentage of the first item to 39% and the second item to 40%, then the second item may receive a slot originally designated for the first items when available. In another example, a less frequently purchased item may be purchased, and its space may be used for a more frequently purchased item. In the example, a first item may have a purchase percentage of 10% and a second item may have a purchase percentage of 15% with a 20-item capacity secondary storage unit. If a user purchases the second item changing the purchase percentage of the first item to 8% then the first item may lose a slot originally designated for the first item when available. If the item purchased is to be replaced with a more frequently purchased item then the method 700 may progress to operation 712. If the item purchased is not to be replaced with a frequently purchased item, then the method 700 may progress to operation 714.

In operation 712, the purchased item from the secondary storage unit is replaced with a more frequently purchased item. Upon a purchase of an item, a space may be open for a replacement item. If the item to be replaced was of a lesser frequency of purchase when compared to a replacement of the original item, then a more frequently purchased item may fill the space. For example, a first item with a 9% purchase frequency may be purchased. If a second item has a 10% purchase frequency, it may take a space previously occupied by the first item.

In operation 714, the secondary storage unit is replenished with the same item that was purchased. Upon a purchase of an item, a space may be open for a replacement item. If the item to be replaced was not of a lesser frequency of purchase, when compared to replacement items, then the same item may be replenished within the space. For example, a diet cola may be purchased without changing the most frequently purchased items. The space previously occupied by the diet cola may be replaced by a second diet cola.

In operation 716, the resultant stock within the secondary storage unit remains the same. If a purchase has not been made, or the purchased item is replaced with a similar item, then the stock of items within the secondary storage unit may remain the same.

Figure 8:
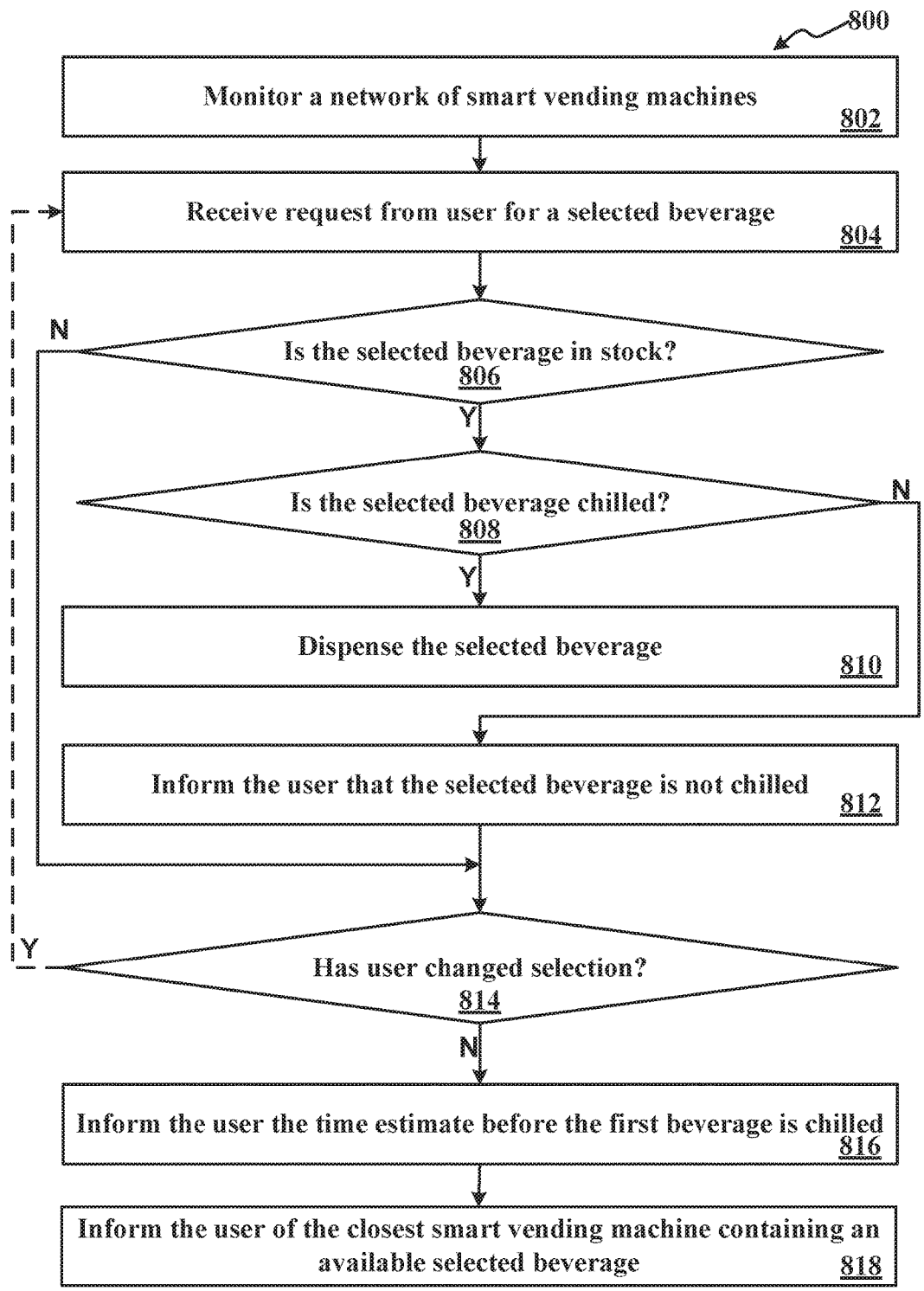
FIG. 8 depicts a flowchart for vending an item to a user, according to various embodiments of the disclosure.

FIG. 8 depicts a flowchart for vending an item to a user, according to various embodiments. A method 800 is illustrated where a user may make an input on a smart vending machine to receive the item. If the item is not in stock or not chilled, alternative options may be given to the user. The alternative options may include a second item selection, vending the item before the chilled determination, giving the user an estimated wait time, or informing the user of a second smart vending machine with the selection in stock.

In operation 802, a network of connected smart vending machines is monitored. The network of connected smart vending machines may communicate through the network informing one another of their current stock. The network may include one or more smart vending machines. The network may also include a central data storage and/or cloud storage node where gathered data analytics from the connected smart vending machines may be stored and accessed. For example, only one smart vending machine may be available, such that no other smart vending machines are within a proximity. The singular smart vending machine may connect to a central data storage. An operator may access compiled data of other vending machines not within the proximity to determine usage statistics. In an additional example, two smart vending machines, a first smart vending machine and a second smart vending machine, may be within a proximity of each other. The first smart vending machine may connect to the second smart vending machine over the network and gather data analytics such as stock information from a computer system/server of the second vending machine.

In operation 804, a user may input a request for a selected item. A user may input an item selection for the selected item. The smart vending machine may receive the request and compare the request of the selected item to the current stock within the smart vending machine. For example, a user may select a diet cola through an input module (e.g., input module 414, FIG. 4).

In decision block 806, a determination is made if the selected item is in stock. The determination may include comparing the selected item to the current stock of items within the smart vending machine. The current stock may be checked and used to determine if the item is available. If the item is not in stock for the first vending machine, then the method 800 may progress to operation 814. For example, a user may select a diet cola. The diet cola in the smart vending machine may be out of stock of diet cola, in response to which the user may be prompted to make a second selection or receive a refund (or not be charged). Alternatively, if the item is in stock in the first smart vending machine, then the method 800 may progress to decision block 808. For example, a user may select a diet cola. The diet cola in the smart vending machine may be in stock.

In decision block 808, a determination is made if the selected item is chilled. If a user makes a selection that is in stock, a second determination may be made if the selected item is chilled. An item may be determined as chilled if the temperature of the item has reached a temperature threshold. For example, the temperature threshold may be set at 42° F. and below (or within a temperature range of 38-42° F.). If the selected item is determined as not chilled, then the method 800 may progress to operation 812. In the example, the selected item may be at a temperature of 52° F., which is greater than the temperature threshold (or outside the temperature range of 38-42° F.). If the selected item is determined as chilled, then the method 800 may progress to operation 810. In the example, the selected item may be at a temperature of 39° F., which has reached the temperature threshold (or within the temperature range of 38-42° F.).

In operation 810, the selected item is dispensed to the user. If the user has made a selection that is both in stock and chilled, then the selected item may be dispensed to the user and the method 800 may stop. For example, a user may select a diet cola. There may be at least one diet cola in the secondary storage unit that has reached the temperature threshold. The selection of the diet cola may then be dispensed to the user in response to the input of the user.

In operation 812, the user may be informed that the selected item is not yet chilled. If the users first selection is not yet chilled the input may inform the user that the item is not yet ready to be dispensed. The user then may make a second selection, or receive a refund.

In various embodiments, an option may be available such that a user may "override" the not yet chilled result, and choose to vend the item at the current temperature. The selection may be based on the user preference that a chilled item may not be required. For example, a user may select a diet cola. The input may inform the user that the diet cola is not yet chilled. The user may select override, and the diet cola may be dispensed to the user at its current temperature.

In decision block 814, a determination is made if a user has changed their selection. A user may change their selection from a selected item to a second item. For example, a user may select a diet cola as their selected item, but the diet cola may be out of stock or not yet chilled, and not be able to be vended. The user may change their selection to a second item, which may be a lemon soda. If the user changes their selection, then the method 800 may return to operation 804. If the user does not change their selection, then the method 800 may progress to operation 816.

Returning to operation 804, the user may have changed their selection of a first item to a second selection of a second item. The second item selection may or may not be in stock, chilled, and/or ready to be dispense. In an example, a user may make a first selection of a diet cola, which is not yet chilled. The user may then change their selection to a lemon soda, which may be dispensed to the user in response to the selection of the lemon soda.

In operation 816, the user may choose not to change their selection and the user may be informed of a time estimate before the selected first item is chilled. The smart vending machine may calculate an estimated wait time until the selected item is chilled. For example, a user may select a diet cola. A first diet cola within the secondary storage unit may be the coolest and may be at a temperature of 46° F., which may be 4° F. over than the desired temperature threshold of 42° F. A data analytics unit may calculate a 3-minute wait time until the diet cola is chilled. The user may then wait for the item to become chilled or proceed to a second smart vending machine. In an additional example, a user may select an item that is not in stock, and the wait time may not be offered because the item is not in stock.

In various embodiments, the user may opt to receive a notification when the selected item is available for vending. If a user selects an item that is unavailable including not in stock, or not currently meeting a condition such as chilled, the user may opt into a notification system. The user may receive a notification (e.g., text message, email, etc.) that their item is ready for vending. In various embodiments, the item may be reserved for the user until the user picks up the item.

In operation 818, the user is informed by the smart vending machine of another smart vending machine (second smart vending machine) containing an available selected first item. The second smart vending machine may be connected over a network, such as the Internet or a local-area-network, with at least one more additional smart vending machines. The user may be informed of the second smart vending machines within the proximity that contain a first item that is in stock and/or chilled. The user may interact with the first smart vending machine to determine the location of the second smart vending machine within a proximity to acquire the item they desire.

The present invention may be a system, a method, and/or a computer program product. The computer program product may include a computer readable storage medium (or media) having computer readable program instructions thereon for causing a processor to carry out aspects of the present invention. The computer readable storage medium may be a tangible device that may retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for monitoring a climate-controlled vending machine using data analytics, the method comprising:
    storing two or more items within a primary storage unit of the climate-controlled vending machine;
    determining that a first slot is available within a secondary storage unit of the vending machine, the secondary storage unit being a climate-controlled unit;
    transferring a first item of the two or more items within the primary storage unit into the first slot of the secondary storage unit, wherein the first item is in a condition at a time of the transferring;
    altering the condition of the first item within the secondary storage unit to a first condition;
    monitoring the condition of the first item to determine if the first item is at the first condition;
    receiving, from a user, a selection of the first item;
    informing the user if the first item has not met the first condition;
    prompting the user with an option to make a new selection if the first item has not met the first condition;
    dispensing, using a dispensary unit, the first item from the first slot, to the user in response to receiving the selection of the first item; and
    replenishing the first slot with a replacement item from the primary storage unit.

2. The method of claim 1, wherein replenishing the first slot with a replacement item includes:
    determining that a second item of the two or more items is more frequently purchased than the first item; and
    replenishing the first slot with the second item as the replacement item.

3. The method of claim 1, further comprising:
    connecting one or more climate-controlled vending machines, including the climate-controlled vending machine, over a network;
    monitoring the one or more climate-controlled vending machines, over the network, using data analytics, wherein the data analytics include
        collecting item selection statistics of the one or more climate-controlled vending machines,
        transmitting the item selection statistics to a central data storage, and
        selecting the first item for the first slot of the secondary storage unit using the item selection statistics;
    compiling the item selection statistics, from the central data storage, for each of the one or more climate-controlled vending machines,
    determining that the climate-controlled vending machine has the first item; and
    dispensing, in response to the determination of the climate-controlled vending machine having the first item, the first item to the user.

4. The method of claim 3, further comprising:
    determining that the climate-controlled vending does not have the first item; and
    informing, in response to the determination of the climate-controlled vending machine not having the first item, the user of a second climate-controlled vending machine of the one or more climate-controlled vending machines within a proximity containing the first item.

5. The method of claim 3, wherein the data analytics further includes:
    updating stock information of the climate-controlled vending machine based on supply and demand information and the item selection statistics; and
    transmitting the stock information to the central data storage.

6. The method of claim 5, wherein the climate-controlled vending machine issues a low stock alert when a first item falls below a first stock threshold.

7. The method of claim 3, wherein the data analytics are compiled using cloud analytics relating to the data analytics of the one or more climate-controlled machines.

8. The method of claim 1, wherein the secondary storage unit contains one or more condition monitors for determining the first condition of the first item stored within the secondary storage unit.

9. The method of claim 1, further comprising:
    determining usage statistics of the climate-controlled vending machine; and
    altering a condition of the secondary storage unit based on the usage statistics to a second condition.

10. A system for monitoring a climate-controlled vending machine using data analytics, the system comprising:
    a memory;
    a processor device communicatively coupled to the memory; and a data analytics unit of the climate-controlled vending machine that is communicatively coupled to the processor device and the memory wherein the climate-controlled vending machine is configured to store two or more items within a primary storage unit of the vending machine, determine that a first slot is available within a secondary storage unit of the vending machine, the secondary storage unit being a climate-controlled unit, transfer a first item of the two or more items within the primary storage unit into the first slot of the secondary storage unit, wherein the first item is in a condition at a time of the transfer, alter the condition of the first item within the secondary storage unit to a first condition, monitor the condition of the first item to determine if the first item is at the first condition, receive, from a user, a selection of the first item, inform the user if the first item has not met the first condition, prompt the user with an option to make a new selection if the first item has not met the first condition, dispense, using a dispensary unit, the first item from the first slot, to the user in response to receiving the selection of the first item, and replenish the first slot with a replacement item from the primary storage unit.

11. The system of claim 10, wherein the climate-controlled vending machine is further configured to:

connect to one or more climate-controlled vending machines, including the climate-controlled vending machine, over a network;

communicate with the one or more climate-controlled vending machines, collecting item selection statistics, transmitting the item selection statistics to a central data storage, and selecting the first item for the first slot of the secondary storage unit using the item selection statistics;

compile, the item selection statistics from the central data storage, for each of the one or more climate-controlled vending machines;

determine that the climate-controlled vending machine has the first item; and dispense, in response to the determination of the climate-controlled vending machine having the first item, the first item to the user.

12. The system of claim 11, wherein the climate-controlled vending machine is further configured to:

determine that the climate-controlled vending does not have the first item; and inform, in response to the determination of the climate-controlled vending machine not having the first item, the user of a second climate-controlled vending machine of the one or more climate-controlled vending machines within a proximity containing the first item.

13. The system of claim 11, wherein the data analytics unit is further configured to:

update the item selection statistics unit of the climate-controlled vending machine based on supply and demand information and the item selection statistics; and transmit the supply and demand information and the item selection statistics from the item selection statistics unit to the central data storage.

14. The system of claim 13, wherein the climate-controlled vending machine issues a low stock alert when an amount of a first item falls below a first stock threshold.

15. A computer program product for monitoring a climate-controlled vending machine using data analytics, the climate-controlled vending machine comprising a computer readable storage medium having a computer readable application stored therein, wherein the computer readable application, when executed on a computing device, causes the computing device to:

store two or more items within a primary storage unit of the vending machine;

determine that a first slot is available within a secondary storage unit of the vending machine, the secondary storage unit being a climate-controlled unit;

transfer a first item of the two or more items within the primary storage unit into the first slot of the secondary storage unit, wherein the first item is in a condition at a time of the transfer;

alter the condition of the first item within the secondary storage unit to a first condition after the first item has been transferred;

monitor the condition of the first item to determine if the first item is at the first condition;

receive, from a user, a selection of the first item;

inform the user if the first item has not met the first condition;

prompt the user with an option to make a new selection if the first item has not met the first condition;

dispense, using a dispensary unit, the first item from the first slot, to the user in response to receiving the selection of the first item; and replenish the first slot with a replacement item from the primary storage unit.

16. The computer program product of claim 15, wherein the computing device is further configured to:

connect to one or more climate-controlled vending machines, including the climate-controlled vending machine, over a network;

communicate with the one or more climate-controlled vending machines, collecting item selection statistics, transmitting the item selection statistics to a central data storage, and selecting the first item for the first slot of the secondary storage unit using the item selection statistics;

compile, the item selection statistics from the central data storage, for each of the one or more climate-controlled vending machines;

determine that the climate-controlled vending machine has the first item; and dispense, in response to the determination of the climate-controlled vending machine having the first item, the first item to the user.

17. The computer program product of claim 16, wherein the computing device is further configured to:

determine that the climate-controlled vending does not have the first item; and inform, in response to the determination of the climate-controlled vending machine not having the first item, the user of a second climate-controlled vending machine of the one or more climate-controlled vending machines within a proximity containing the first item.

18. The computer program product of claim 17, wherein the computing device is further configured to:

update the item selection statistics unit of the climate-controlled vending machine based on supply and demand information and item selection statistics; and transmit the supply and demand information and item selection statistics from the item selection statistics unit to the central data storage.

19. The computer program product of claim 18, wherein the climate-controlled vending machine issues a low stock alert when an amount of a first item falls below a first stock threshold.

20. The computer program product of claim 15, wherein the secondary storage unit contains condition monitors for determining the first condition of the first item stored within the secondary storage unit.

\* \* \* \* \*